2 Sheets—Sheet 1.

H. W. THOMSON.
Combined Horse Collar and Hames.

No. 198,227. Patented Dec. 18, 1877.

Witnesses:
James Martin Jr.
J. P. Theodore Lang.

Inventor,
Harrison William Thomson
by
Mason, Fenwick & Lawrence

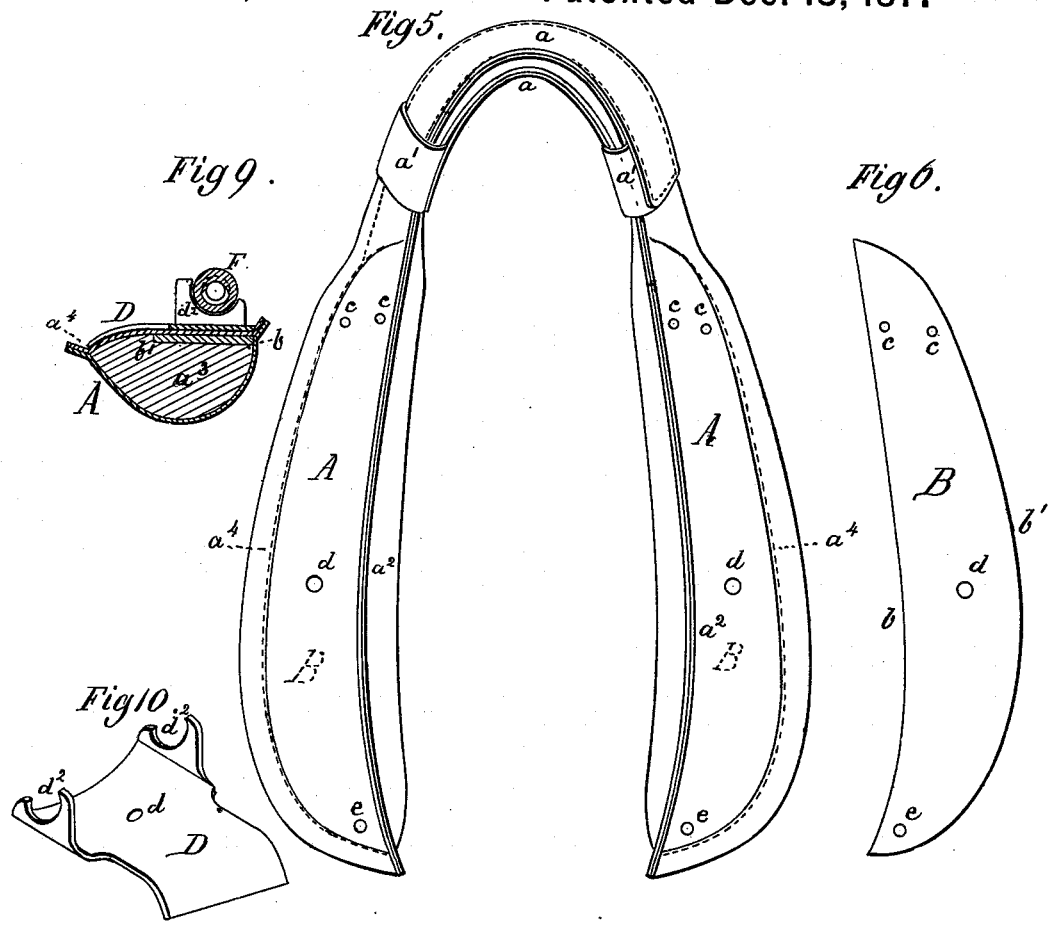
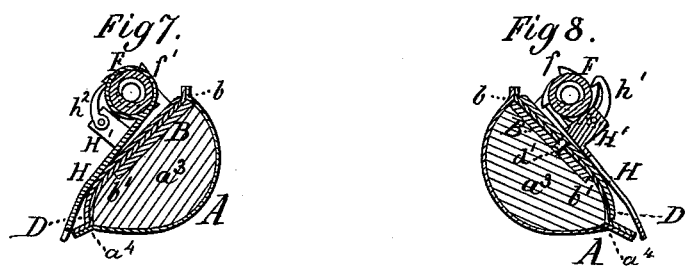

UNITED STATES PATENT OFFICE.

HARRISON WILLIAM THOMSON, OF LOUISVILLE, KENTUCKY.

IMPROVEMENT IN COMBINED HORSE-COLLAR AND HAMES.

Specification forming part of Letters Patent No. 198,227, dated December 18, 1877; application filed July 6, 1877.

*To all whom it may concern:*

Be it known that I, HARRISON WILLIAM THOMSON, of Louisville, in the county of Jefferson and State of Kentucky, have invented a new and useful Improvement in Horse-Collars and Hames combined, which improvement is fully set forth in the following specification and accompanying drawings, in which latter—

Figure 1:
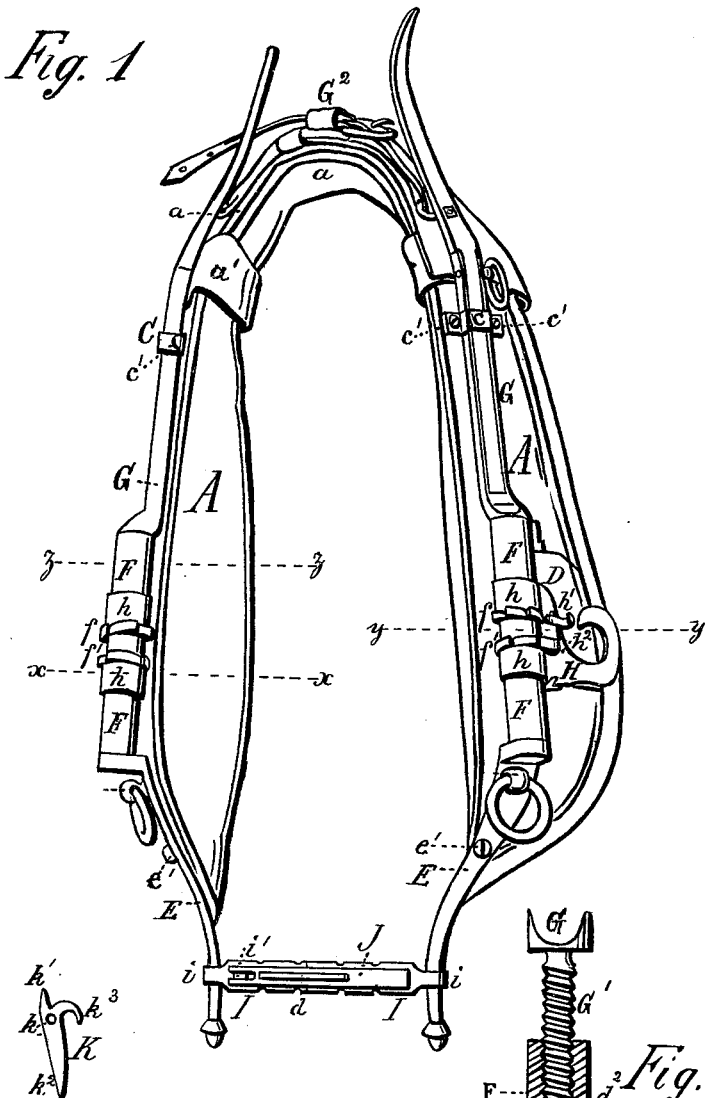
Figure 4:
Figure 3:
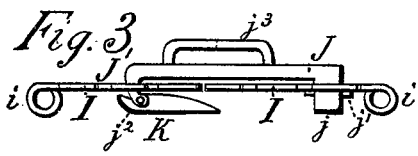
Figure 2:
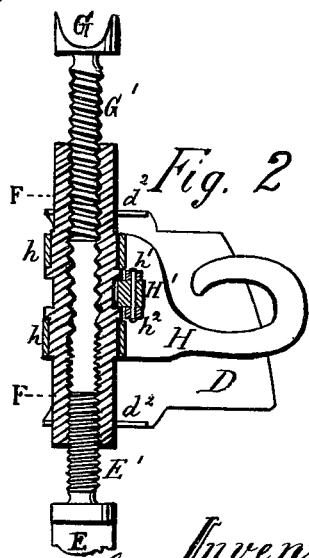

Figure 1 is a perspective view of my improved collar and hames. Fig. 2 is a sectional detail of the adjusting parts of the hames. Fig. 3 is a top view of the lower clasp of the hames. Fig. 4 is an elevation of the locking-hook of the said clasp. Fig. 5 is an elevation of the adjustable collar without the hames. Fig. 6 is an elevation of a strengthening-plate inserted into the side padding of the collar. Fig. 7 is a cross-section of the collar in the line $x\,x$ of Fig. 1. Fig. 8 is a cross-section of the collar in the line $y\,y$ of Fig. 1. Fig. 9 is a cross-section of the collar in the line $z\,z$ of Fig. 1; and Fig. 10 is a perspective detail view of the plate, whereby the hames are protected against being disarranged or broken by the draft of the horse.

The nature of my invention consists in certain constructions, combinations, and arrangements of parts, hereinafter fully described and specifically claimed, whereby an adjustable collar with adjustable hames is produced, which may be easily adjusted in a short time upon the neck of a horse of any size, and which can be changed rapidly from one horse to another, no matter how different their sizes may be.

The object of my invention is to facilitate the change of horses at depots, stage-routes, or other stations, the present difficulties consisting in the necessity of keeping and having ready a number of different sets of collars and hames for different-sized horses, whereby the work of exchanging horses is greatly retarded, and the expenses of keeping a stage or car line in running order are greatly augmented.

In the drawings, A represents two halves of the collar, each of which, A, is provided with an elongated neck-band, $a$, and a loop, $a^1$, at its end. The neck-bands $a$ are passed each through the loop $a^1$ of the other, so that they lie upon each other just above the mane of a horse, while the loop of the right half of the collar rests upon the left side of the horse's neck, and the loop of the left half on the right side.

By means of this described construction I am enabled to give the span of the collar more or less height by simply slipping the loops $a^1$ nearer together or farther apart.

The front part of each half of the collar is provided with a strong metal plate, B, which is sewed or otherwise attached to the inside of the collar, just between the leather covering and the stuffing $a^3$, and the inner edge $b$ of this plate runs along the inner seam $a^2$ of the collar half, while the outer edge $b^1$ runs in a direction with and at some distance from the outer seam $a^4$ of the collar half, as shown in Figs. 5, 7, 8, and 9, so as not to make the padding too stiff upon the horse's neck, and to prevent the said seam from being worked or rubbed asunder by the edge $b'$. The plate B is provided with holes $c$ for fastening a staple, C, by means of screws $c'$, and with a hole, $d$, for fastening a brace or steady plate, D, by means of a screw or rivet, $d'$, as shown in Fig. 8, and with a hole, $e$, for fastening the lower stationary parts E of the hames by means of screws $e'$. The said parts C D E are fastened to the plates B with the leather covering of the collar between.

The upper end of the part E is formed into a screw, E', which is screwed into the lower part of a swivel, F. The upper end of the swivel F contains the screw end $G^1$ of the upper or adjustable part G of the hames. The main body of the part G is straight, so it may easily move up and down in the staple C. Above the staple C the parts G are coupled or connected by means of an ordinary buckle-strap, $G^2$, which is long enough to permit its adjustment to the greatest extension of the collar.

The swivel F rests upon bearings $d^2$ raised from the plate D, which prevent its lateral displacement, and at the same time permit it to turn and move longitudinally. The screws $G^1$ and E' have threads the reverse of each other, and the thread of the upper screw $G^1$ is coarser than the thread of the lower screw, so that by turning the swivel F the proportions of the size of the collar and the altitude of the swivel to which the traces are attached are preserved in every instance, and the horse is not made uncomfortable by a wrong position of the traces.

The attachment of the traces to the swivel consists of a hook, H, with cylindrical bearings or swivels $h$, fitted upon the swivel F. Between the swivels $h$ the swivel F is provided with a right and left ratchet rim, $f$ and $f'$, whereby the hook is prevented from slipping longitudinally on the swivel F.

Between the ratchet rims $f\ f'$ a lug, H', is fastened to the hook H, which lug carries a hooked pawl, $h^1$, and a straight pawl, $h^2$, for operating the ratchet rims in reverse directions. The plate D is made large enough to receive all the side wear of the hook H when the collar is in use, and thereby protects the collar.

The parts E are, near their lower ends, provided with a clasp, which consists of two metal bars, I, swiveled or otherwise attached at $i$ to said parts E, and provided with holes $i'$ of suitable shape, square or oblong being preferred. The head $j$ of a coupling-bar, J, is inserted into one of the holes $i'$, and there secured by a locking-pin, $j^1$, or otherwise. The bar J is at the other end provided with a split or slotted hook, J', terminating in two bosses, $j^2$, to and between which a hook-lever, K, is pivoted. The lever K is pivoted at $k$ so that two arms, a long one, $k^2$, and a short one, $k^1$, are thereby formed. Opposite the pivot $k$ a hook, $k^3$, is formed on the lever K, which hook is of the same shape as J' of the bar J.

In coupling the bar I, after the head $j$ is secured, the long arm $k^2$ is turned off as far as it will go, and moved into one of the holes $i'$ of the opposite bar until the hook $k^3$ comes in contact with the bar I, whereby the lever K is turned over, and the short arm $k^1$ is moved through the hole $i'$.

To uncouple the clasp, the long arm $k^2$ is turned up until the short arm $k^1$ passes through the hole $i'$, and the bar is slipped over the said long arm.

By this means the lower ends of the hames may be instantly clasped, unclasped, or adjusted by an unskilled person without the danger of having the parts disarranged.

The main strain during operation is upon the hook J'; but the hook $k^3$ being of the same shape, the lever K is thereby prevented from changing its parallel position with the bar I and unlocking the clasp, and if any backlash should occur the opposite bar I would be pushed between the arm $k^1$ and the hook $k^3$.

The collar and hames may also be provided with all the usual attachments, such as rings or guides for the reins, and so on.

The bar J may be provided with a ring or bail, $j^3$, to which the chain or strap of a breast-yoke will be attached when two horses are hitched together.

Operation: When the collar is found too small for a horse, the operator moves the pawl $h^1$ upon the ratchet $f$, and holds it there by pressing his thumb on it, while, with the other part of his hand, he oscillates the hook H, and thereby turns the swivel F and elevates the part G and the swivel as high as is required; he then repeats the said operation on the other side. The strap $G^2$ is next adjusted according to the thickness of the horse's neck; and, lastly, by putting the inner neck-band $a$ upwardly until the upper neck-band $a$ comes in contact with the said strap $G^2$, the collar will have received its desired extension. When the said adjustment is effected, it will be found that by means of the above-described construction of the screws E' and $G^1$ and the swivel F, the trace-hooks H are raised only a small portion of the distance to which the upper parts G of the hames are raised, in consequence of which the relative position of the hooks H is now the same for the large-necked horse as it was before for the small-necked horse.

By throwing pawl $h^1$ out of action and $h^2$ into action, the parts E' and G can be adjusted, in order to contract the collar. The pawls $h^1\ h^2$ are turned back after use, so as not to accidentally move the swivel. Finally, the clasp I J is adjusted and locked.

The horse-collar A is left open below, so as to leave the animal's throat unmolested, and allow a circulation of air between the neck and the collar, and thus relieve the animal from the oppressive heat caused by a closed collar.

Having described my invention, what I claim as new, and desire to secure by Letters Patent, is—

1. The collar halves A, having upper extensions $a$ and loops $a'$, in combination with the hame-bars and adjusting contrivances thereof, whereby the collar is rendered capable of adjustment (either larger or smaller) upon the horse's neck, by simply adjusting the hames, substantially as set forth.

2. The combination of an adjustable horse-collar, and hames which are capable of being lengthened and shortened, and which, by the said lengthening and shortening, cause the attachments of the traces to be proportionately adjusted in height, substantially as set forth.

3. The hames attached to rigid perforated plates B, which are constructed and confined within the collar-halves, substantially in the manner and for the purpose described.

4. The combination of the longitudinally-adjustable hames G, having an upper adjustable coupling-strap, $G^2$, and a lower adjustable coupling, I J, and an adjustable collar, A A, substantially as set forth.

5. The hames E G, having screw ends E' $G^1$, with reversed threads, and a coupling and adjusting swivel, F, substantially as set forth.

6. The combination, in a horse-collar, A, of the inner plate B and the outer plate D, having raised bearings $d^2$, substantially as and for the purpose set forth.

7. The combination of the plate D, having raised bearings $d^2$ and the swivel F, substantially as set forth.

8. The combination of the swivel F and the trace-hook H, substantially as set forth.

9. The combination of the swivel F, having reversed ratchets $f f'$, and the swinging plate H, having reversed pawls $h^1 h^2$, substantially as set forth.

10. The combination of the hames E, fixed to the collar, swivel F, having fixed guides $d^2$ and the movable hames G, having guides C fixed to the collar, substantially as set forth.

11. The combination of the bars I, having holes $i'$, and the locking-rod J, having a head, $j$, and a hook, J', and hooked lever K, substantially as set forth.

Witness my hand in the matter of my application for a patent for horse-collar and hames combined this 3d day of July, 1877.

HARRISON WILLIAM THOMSON.

Witnesses:
L. A. THOMSON,
H. S. THOMSON.